United States Patent [19]

Beacham et al.

[11] 4,207,225
[45] Jun. 10, 1980

[54] ALKOXYALKYL PHOSPHATE PLASTICIZING COMPOSITIONS

[75] Inventors: Harry H. Beacham, Langhorne, Pa.; James P. Hamilton, Trenton, N.J.

[73] Assignee: FMC Corporation, Philadelphia, Pa.

[21] Appl. No.: 18,195

[22] Filed: Mar. 6, 1979

[51] Int. Cl.$^2$ ............................ C08K 5/49; C09K 3/28
[52] U.S. Cl. ................................. 260/30.6 R; 252/8.1
[58] Field of Search ...................... 252/8.1; 260/30.6 R

[56] References Cited

U.S. PATENT DOCUMENTS

| | | | |
|---|---|---|---|
| 2,168,587 | 8/1939 | Shuman | 260/30.6 R X |
| 2,450,903 | 10/1948 | Mikeska | 260/966 |
| 2,557,089 | 6/1951 | Gamrath et al. | 260/30.6 R |
| 2,557,090 | 6/1951 | Gamrath et al. | 260/30.6 R |
| 3,553,155 | 1/1971 | Garrett | 260/30.6 R |
| 3,576,923 | 4/1971 | Randell et al. | 260/966 |
| 3,919,158 | 11/1975 | Randell et al. | 260/30.6 R |
| 3,976,616 | 8/1976 | Comby et al. | 260/30.6 R |

*Primary Examiner*—Leland A. Sebastian
*Attorney, Agent, or Firm*—Robert W. Kell; Frank Ianno

[57] ABSTRACT

A plasticizing composition for polyvinyl chloride resin is prepared by mixing from about 20 to about 50 parts by weight of tris(alkoxyalkyl)phosphate having the formula

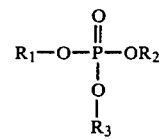

wherein $R_1$, $R_2$ and $R_3$ are alkoxyalkyl radicals having the formula:

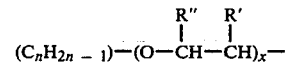

wherein n is an integer from 1 to 18;
x is an integer from 1 to 2;
R' is either hydrogen or an alkyl radical, and
R" is either hydrogen or an alkyl radical;

in combination with from about 80 to about 50 parts by weight of another phosphate ester selected from the group consisting triaryl phosphate, alkyl diphenyl phosphate, trialkyl phosphate, tris(alkylphenyl)phosphate, alkylphenyl/phenyl phosphate, and mixture thereof. Polyvinyl chloride resins plasticized with 30 or more parts per hundred of such phosphate ester plasticizer mixtures are heat stable, fire resistant and flexible at low temperatures.

38 Claims, No Drawings

ALKOXYALKYL PHOSPHATE PLASTICIZING COMPOSITIONS

Polymerized vinyl chloride resin and copolymers of vinyl chloride with vinyl acetate and vinylidene chloride are normally rigid in their unplasticized state and are generally milled with from 30 to 150 parts per hundred of one or more plasticizers. The plasticizers are chosen in accordance with their known properties to impart flexibility and other desirable characteristics which relate to the end use of the plasticized resin.

Triaryl phosphate esters have long been used to plasticize polyvinyl chloride resins because of the excellent fire resistance imparted by such esters. The alkyl phthalates are less costly and result in excellent low temperature flexibility but are not suitable if good fire resistance is desired.

One group of plasticizers that have found considerable acceptance are the alkyl diphenyl phosphates such as octyl diphenyl phosphate and isodecyl diphenyl phosphate described in U.S. Pat. No. 2,557,189. Years after the alkyl diaryl phosphates were introduced commercially for their low temperature and fire resistance properties it was found that they also provided unexpectedly low smoke levels during combustion (vs. triaryl phosphates). This property further enhanced the status of the alkyl diphenyl phosphates, since low smoke levels could not be achieved by blending. The status of the various aryl vs. alkyl diaryl phosphates in flame retarding performance was summarized in a paper given by C. N. Keeney to the Denver Society of Plastic Engineers in November of 1977.

Stabilizers are also added to polyvinyl chloride compositions and perform the function of protecting the polyvinyl chloride resin from decomposition when subjected to a high energy source, principally thermal energy, although light and other radiant energy can exercise similar degradative effects. Although there is not universal agreement regarding the various mechanisms of stabilization, it is generally accepted that the chemistry responsible for instability involves dehydrochlorination of vinyl chloride polymer chains. Once initiated in a polymer chain the reaction becomes autocatalytic giving rise to large quantities of corrosive hydrogen chloride and leaving a highly unsaturated polymer residue. Double bonds in this residue tend to be conjugated because of the head to tail nature of the vinyl polymerization placing chlorine atoms on alternating carbon atoms of the backbone chain. The resulting conjugated polymer undergoes further reaction including crosslinking and cyclization to aromatic residues many of the products being colored chromophores. In fact, the first evidence of instability in polyvinyl chloride compositions is usually seen by discoloration to yellow, then brown and ultimately black.

To retard or delay this decomposition of the vinyl polymer during high temperature processing, including compounding, extrusion, molding, etc., stabilizers are used in the compound formulation. Three general types of stabilizers are employed.

(1) Organometallic derivatives of metals such as Ba, Cd, Zn, Sn, Ca and Pb. Typically these are simple soaps of fatty acids because of relatively low costs of such derivatives. Presumably these function as bases to absorb initially released HCl and suppress autocatalytic influence of the acid on further dehydrohalogenation.

(2) Epoxidized aliphatics and glycidyl aromatics which function similarly to the metal bases by absorbing released HCl.

(2) Antioxidant materials such phosphites. The mechanism is unknown but may involve suppression of radical reactions.

One or more of these stabilizers are found as additives in essentially all vinyl formulations. In unfilled, unplasticized vinyl formulations, they may constitute the largest volume additive and are usually at least the second largest in plasticized vinyls. Unlike most plasticizers which are designed to permit maximum compatibility (solubility) with the vinyl resin, stabilizer additives or products derived from them by acting on the vinyl resins decomposition products, possess only limited solubility in the resin matrix. Hence, they tend to migrate from the resin especially during high temperature processing.

Epoxy compounds, especially those containing two or more oxirane groups, probably polymerize to less soluble polymeric materials which, in any event, have a high affinity for the metal surfaces found in molds, mills, extruders, etc. Metal soaps of fatty acids, (eg. Ba, Cd stabilizers) more closely resemble mold lubricants, that is materials which migrate to mold surfaces, than do the additives such as plasticizers which are truly compatible with the resin. Hence, such additives along with any other materials of limited compatibility such as filler, coupling agents, glass finishes, organic pigments, waxes, etc. tend to collect on surfaces and under certain conditions lead to the phenomenon known as "plate-out". When "plate-out" occurs on molds, surfaces of parts are adversely affected—low gloss, and loss of detail, also parts may stick due to the mold fouling or scumming. If severe, molding operations must be shut down to permit cleaning; frequently a costly and time consuming operation in an intricate mold. Surfaces of calendering rolls may be similarly coated with "plate-out". An especially objectional manifestation of "plate-out" may also be found in extruders where build up may go undetected until suddenly uncontrollable resin decomposition occurs as a result of increased heat of shearing, necessitating a complete shut down of production and costly cleaning of the disassembled equipment.

The extrusion of plasticized polyvinyl chloride resin compositions at elevated temperatures in the range of 180° C.–200° C. may therefore result in decomposition that is related to the amount and type of stabilizer present. Thermal decomposition may occur in the presence of substantial amounts (6–9 parts per hundred) of one or more stabilizers such as cadmium, barium and tin salts, epoxy compounds, etc. Decomposition is a particular problem in the manufacture of coated wire that is made by extruding around one or more conductive cores a polyvinyl chloride resin which is plasticized with an alkyl diphenyl phosphate such as octyl diphenyl phosphate. Substitution of other aryl phosphate plasticizers for the octyl diphenyl phosphate results in less than satisfactory low temperature flexibility.

Decomposition of plasticized polyvinyl chloride resin compositions within the extruder at elevated temperatures results in rapid "plating out" of carbon and metallic salts on the screw and die of the extruder and requires excessive down time. The extruder, which normally might be disassembled and cleaned once a week may become inoperative in less than 8 hours with the result that production comes to a stand still.

Although "plate-out" is a fairly common problem, we have now discovered that decomposition, and the attendant problems caused thereby, can be avoided by employing a mixture of two plasticizers. The plasticizing compositions of the present invention provide the multiple function of plasticization, flame retardancy and suppression of "plate-out" in a single highly effective additive.

In accordance with the present invention from about 50 to 80 parts of one plasticizer, type A, is combined with from 20 to about 50 parts of a different plasticizer, type B. From about 30 parts to about 150 parts by weight of this mixture of plasticizer A and B is milled with one hundred parts by weight of a polyvinyl chloride resin to give a resin composition that may be extruded at 180°–200° C. without decomposition. The plasticized polyvinyl chloride resin composition is heat stable and may be extruded without decomposition to give products characterized by excellent low temperature flexibility (−20° C.) and flame resistance (28–29 oxygen index).

The plasticizer, type A, used in the present invention may be a known plasticizer for polyvinyl chloride selected from the group consisting of an alkyl diphenyl phosphate such as octyl diphenyl phosphate, a triaryl phosphate such as triphenyl phosphate, a trialkylphenyl phosphate, such as the tricresyl and trixylenyl phosphates, an alkylphenyl/phenyl phosphate such as cresyl diphenyl phosphate, a mixed alkylphenyl/phenyl phosphate such as those described in U.S. Pat. No. 3,919,158 or any mixture of the above described phosphate esters. A particularly preferred plasticizer of this group is isopropylphenyl/phenyl phosphate (KRONITEX 100 ®) available from FMC Corporation, 2000 Market Street, Philadelphia, Penn. 19103). Isopropylphenyl/phenyl phosphate has been previously used to plasticize polyvinyl chloride resin but such plasticized resin compositions were not acceptable for the coating of wire because of poor low temperature flexibility characteristics.

The plasticizer B used in the present invention is a tris(alkoxyalkyl)phosphate. Suitable alkoxyalkyl phosphates have the structural formula:

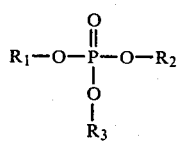

wherein $R_1$, $R_2$ and $R_3$ are alkoxyalkyl radicals having the structural formula:

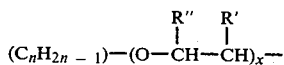

wherein
n is an integer from 1 to 18,
x is an integer from 1 to 2,
R' is either hydrogen or an alkyl group, and
R" is either hydrogen or an alkyl group.

It is understood that any of the alkyl groups referred to above may contain a secondary or tertiary carbon atom resulting in a branched chain.

Such phosphate may be readily prepared from phosphoric acid or phosphorus oxychloride and commercially available alcohols such as the CELLOSOLVES ® having the formula:

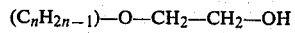

and the CARBITOLS ® having the formula:

wherein n is an integer from 1 to 18. A particularly preferred plasticizer of the B type is tris(butoxyethyl)phosphate which may be derived from BUTYL CELLOSOLVE ®.

As pointed out above, the mixture of plasticizers that are used in the present invention may contain as little as 20 weight percent of type B plasticizer with 80 weight percent of type A plasticizer. The use of less than 20 weight percent of the type B plasticizer in the plasticizer mixture will result in plasticized polyvinyl chloride compositions that lack flexibility in the range of −20° C. and more than about 50 weight percent of type B plasticizer in the plasticizer mixture is normally not needed.

Flexibility as low as −23.4° was achieved with a polyvinyl chloride composition plasticized with 55 parts per hundred of a mixture containing 30 weight percent tris(butoxyethyl)phosphate and 70 weight percent of isopropylphenyl/phenyl phosphate. The plasticized composition was heat stable, had a shore "A" hardness of 76.5, an elongation at break of 307% and the stiffness at room temperature (determined by ASTM Method D-747) was 835 psi.

EXAMPLE I

The physical properties of a series of plasticized polyvinyl chloride resin compositions are compared. In each instance the plasticizer is a mixture of tris(butoxyethyl)phosphate with a synthetic isopropylphenyl/phenyl phosphate. The results are summarized in Table I.

The plasticizer mixtures K110 and K110-W contain 25 and 30 weight percent respectively of tris(butoxyethyl)phosphate with 75 and 70 weight percent respectively of a synthetic isopropylphenyl/phenyl phosphate having the analysis:

| | |
|---|---|
| Triphenyl phosphate | 20.4% |
| 2-Isopropylphenyl diphenyl phosphate | 17.8% |
| 3-Isopropylphenyl diphenyl phosphate | 2.2% |
| 4-Isopropylphenyl diphenyl phosphate | 13.7% |
| Di(2-isopropylphenyl)phenyl phosphate | 11.7% |
| Higher molecular weight alkylphenyl/phenyl phosphates | 34.2% |

The plasticizer mixture KT110 and KT110-W contain 25 and 30 weight percent respectively of tris(butoxyethyl)phosphate with 75 and 70 weight percent respectively of a transalkylated synthetic isopropylphenyl/phenyl phosphate having the analysis:

| | |
|---|---|
| Triphenyl phosphate | 12.8% |
| 2-Isopropylphenyl diphenyl phosphate | 2.7% |
| 3-Isopropylphenyl diphenyl phosphate | 17.6% |
| 4-Isopropylphenyl diphenyl | |

-continued

| | |
|---|---|
| phosphate | 10.9% |
| Di(2-isopropylphenyl)phenyl phosphate | 0.2% |
| Higher molecular weight alkylphenyl/phenyl phosphate | 55.8% |

In Table I, the heat stability is determined by working the plasticized polyvinyl chloride resin compositions in a HAAKE RHEOMIX ® electrically heated to a temperature of 205°±1° C. at 100 revolutions per minute. The torque required of the motor drive unit is plotted by a Haake Model EU-10 recorder and the heat stability, expressed in minutes, is the amount of time that elapsed between the start of mixing and a noticeable increase in torque, i.e., the torque reading may almost double during a period of about 2 minutes when decomposition occurs. The HAAKE RHEOMIX ® unit and recording Unit EU-10 may be acquired from Haake Inc., 244 Saddle River Road, Saddlebrook, N.J. 07662.

EXAMPLE II

The tendency of the plasticized polyvinyl chloride resin blends to plate out during extrusion may be evaluated by milling 150 (or 155) parts of a resin-plasticizer blend with 2 parts per hundred of Red Dye No. 2 for seven minutes on a two roll mill heated to 165° C. The milled resin is then removed and replaced with 150 parts of a colorless polyvinyl chloride resin composition plasticized with 50 parts per hundred of dioctyl phthalate. The residual color that adheres to the roller surfaces from the resin colored with Red Dye No. 2 is picked up by the uncolored resin during milling at 165° C. for 5 minutes. This second resin is removed from the mill after milling for 5 minutes and evaluated subjectively in terms of its color from 0, indicating no color, to 5 indicating a strong color resulting from the residual dye plate out on the roller surfaces. Table II identifies the compositions evaluated in parts by weight and summarizes the heat stability of the plasticized polyvinyl chloride resin compositions and their deposit (plate out) on the rollers of the mill.

TABLE I

PROPERTIES OF PVC RESIN PLASTICIZED WITH A MIXTURE OF TRIS(BUTOXYETHYL) PHOSPHATE AND ISOPROPYLPHENYL/PHENYL PHOSPHATE

| | K110 50 phr | K110 55 phr | K110-W 50 phr |
|---|---|---|---|
| Low Temp. Brittleness (°C.) Impact ASTM D-746 | −15.3 | −17.9 | −17.4 |
| Haake Heat Stability (Mins.) | 44 | 43 | 41 |
| Shore "A" HARDNESS | 81.0 | 78.5 | 80.5 |
| Mod. at 100% Elongation (PSI) | 1684 | 1299 | 1553 |
| % Elong. at break | 360 | 320 | 302 |
| Room Temperature Flexibility ASTM D747 (PSI) | 1126 | 878 | 1056 |

| | K110-W 55 phr | KT110 50 phr | KT110 55 phr |
|---|---|---|---|
| Low Temp. Brittleness (°C.) ImpacT ASTM D-746 | −20.3 | −18.7 | −22.3 |
| Haake Heat Stability (Mins.) | 41 | 47 | 52 |
| Shore "A" Hardness | 77.7 | 79.7 | 77.0 |
| Mod. at 100% Elongation (PSI) | 1087 | 1237 | 1134 |
| % Elong. at break | 393 | 377 | 403 |
| Room Temperature Flexibility ASTM D747 (PSI) | 909 | 995 | 933 |

TABLE I-continued

PROPERTIES OF PVC RESIN PLASTICIZED WITH A MIXTURE OF TRIS(BUTOXYETHYL) PHOSPHATE AND ISOPROPYLPHENYL/PHENYL PHOSPHATE

| | KT110-W 50 phr | KT110-W 55 phr |
|---|---|---|
| Low Temp. Brittleness (°C.) Impact ASTM D-746 | −20.0 | −23.4 |
| Haake Heat Stability (Mins.) | 46 | 49 |
| Shore "A" Hardness | 79.5 | 76.5 |
| Mod. at 100% Elongation (PSI) | 1290 | 1213 |
| % Elong. at break | 337 | 307 |
| Room Temperature Flexibility ASTM D747 (PSI) | 924 | 835 |

TABLE II

| Examples | A[1] | B[1] | C[1] |
|---|---|---|---|
| PVC Resin | 100 | 100 | 100 |
| Isopropylphenyl/phenyl phosphate | 50 | — | — |
| Tris(Butoxyethyl)phosphate | — | 50 | — |
| K110* | — | — | 50 |
| Octyl diphenyl phosphate | — | — | — |
| Epoxy, Stabilizer and Lubricant | 10.75 | 10.75 | 10.75 |
| Haake Heat Stab. (min.) | 42 | 32 | 38 |
| Mill Plate-Out | 2 | 1 | 1 |

| Examples | D[1] | E[2] | F[2] |
|---|---|---|---|
| PVC Resin | 100 | 100 | 100 |
| Isopropylphenyl/phenyl phosphate | — | 55 | — |
| Tris(Butoxyethyl)phosphate | — | — | 55 |
| K110* | — | — | — |
| Octyl diphenyl phosphate | 50 | — | — |
| Epoxy, Stabilizer and Lubricant | 10.75 | 3.2 | 3.2 |
| Haake Heat Stab. (min.) | 34 | 53 | 71 |
| Mill Plate-Out | 3 | 1 | 2 |

| Example | G[2] | H[2] |
|---|---|---|
| PVC Resin | 100 | 100 |
| Isopropylphenyl/phenyl phosphate | — | — |
| Tris(Butoxyethyl)phosphate | — | — |
| K110* | 55 | — |
| Octyl diphenyl phosphate | — | 55 |
| Epoxy, Stabilizer and Lubricant | 3.2 | 3.2 |
| Haake Heat Stab. (min.) | 64 | 20 |
| Mill Plate-Out | 1 | 3 |

*K110 is a mixture of 25 weight percent tris(butoxyethyl)phosphate and 75 weight percent alkylphenyl/phenyl phosphate.
[1]PVC resin stabilized with barium, cadmium salts and epoxy compounds.
[2]PVC resin stabilized with tin salts.

We claim:

1. A composition useful in plasticizing polyvinyl chloride resin to provide excellent heat stability, fire resistance and low temperature characteristics comprising from about 20 to about 50 parts by weight of tris(alkoxyalkyl)phosphate having the formula:

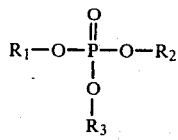

wherein $R_1$, $R_2$ and $R_3$ are alkoxyalkyl radicals having the formula:

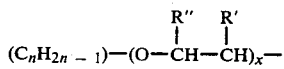

wherein
 n is an integer from 1 to 18,
 x is an integer from 1 to 2,
 R' is either hydrogen or an alkyl group, and
 R" is either hydrogen or an alkyl group;
in combination with from about 80 to about 50 parts by weight of another phosphate ester selected from the group consisting of triaryl phosphate alkyl diphenyl phosphate, trialkyl phosphate, trialkylphenyl phosphate, alkylphenyl/phenyl phosphate a mixed alkylphenyl/phenyl phosphate and mixtures thereof.

2. The plasticizing composition of claim 1 wherein $R_1$, $R_2$ and $R_3$ are alkoxyalkyl radicals having the formula

wherein n is an integer from 1 to 18, and x is an integer from 1 to 2.

3. The plasticizing composition of claim 2 wherein x is 2.

4. The plasticizing composition of claim 2 wherein x is 1.

5. The plasticizing composition of claim 4 wherein said tris(alkoxyalkyl)phosphate is tris(butoxyethyl) phosphate.

6. The plasticizing composition of claim 1 wherein said other phosphate ester is a mixed alkylphenyl/phenyl phosphate.

7. The plasticizing composition of claim 2 wherein said other phosphate ester is a mixed alkylphenyl/phenyl phosphate.

8. The plasticizing composition of claim 3 wherein said other phosphate ester is a mixed alkylphenyl/phenyl phosphate.

9. The plasticizing composition of claim 4 wherein said other phosphate ester is a mixed alkylphenyl/phenyl phosphate.

10. The plasticizing composition of claim 5 wherein said other phosphate ester is a mixed alkylphenyl/phenyl phosphate.

11. The plasticizing composition of claim 10 wherein said mixed alkylphenyl/phenyl phosphate is a mixed isopropylphenyl/phenyl phosphate.

12. The plasticizing composition of claim 11 wherein the amount of said tris(butoxyethyl)phosphate percent in the composition is from about 25 to about 30 parts by weight and the amount of said mixed isopropylphenyl/phenyl phosphate is from about 75 to about 70 parts by weight.

13. The plasticizing composition of claim 12 wherein the amount of said tris(butoxyethyl)phosphate is about 25 parts by weight and the amount of said mixed isopropylphenyl/phenyl phosphate is about 75 parts by weight.

14. The plasticizing composition of claim 12 wherein the amount of said tris(butoxyethyl)phosphate is about 30 parts by weight and the amount of said mixed isopropylphenyl/phenyl phosphate is about 70 parts by weight.

15. A heat stable, fire resistant composition having excellent low temperature characteristics consisting of polyvinyl chloride resin and as a plasticizer therefore from about 20 to about 50 parts by weight of a tris(alkoxyalkyl)phosphate having the formula:

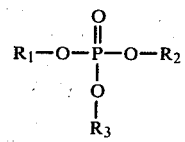

wherein $R_1$, $R_2$ and $R_3$ are alkoxyalkyl radicals having the formula:

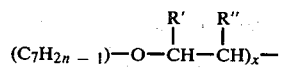

wherein
 n is an integer from 1 to 18,
 x is an integer from 1 to 2,
 R' is either hydrogen or an alkyl group, and
 R" is either hydrogen or an alkyl group; in combination with from about 80 to about 50 parts by weight of another phosphate ester selected from the group consisting of triaryl phosphate, alkyl diphenyl phosphate, trialkyl phosphate, tris(alkylphenyl)phosphate, alkylphenyl/phenyl phosphate and mixtures thereof; the amount of said plasticizer being from about 30 to about 150 parts by weight from each 100 parts by weight of polyvinyl chloride resin.

16. The heat stable, fire resistant composition of claim 15 wherein $R_1$, $R_2$ and $R_3$ are alkoxyalkyl radicals having the formula:

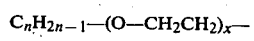

wherein n is an integer from 1 to 18, and x is an integer from 1 to 2.

17. The heat stable, fire resistant composition of claim 16 wherein x is 2.

18. The heat stable, fire resistant composition of claim 16 wherein x is 1.

19. The heat stable, fire resistant composition of claim 18 wherein said tris(alkoxyalkyl)phosphate is tris(butoxyethyl)phosphate.

20. The heat stable, fire resistant composition of claim 15 wherein said other phosphate ester is a mixed alkylphenyl/phenyl phosphate.

21. The heat stable, fire reistant composition of claim 16 wherein said other phosphate ester is a mixed alkylphenyl/phenyl phosphate.

22. The heat stable, fire resistant composition of claim 17 wherein said other phosphate ester is a mixed alkylphenyl/phenyl phosphate.

23. The heat stable, fire resistant composition of claim 18 wherein said other phosphate ester is a mixed alkylphenyl/phenyl phosphate.

24. The heat stable, fire resistant composition of claim 19 wherein said other phosphate ester is a mixed alkylphenyl/phenyl phosphate.

25. The heat stable, fire resistant composition of claim 24 wherein said mixed alkylphenyl/phenyl phosphate is a mixed isopropylphenyl/phenyl phosphate.

26. The heat stable, fire resistant composition of claim 25 wherein the weight ratio of tris(butoxyethyl) phosphate to isopropylphenyl/phenyl phosphate is in the range of from about 25:75 to about 30:70.

27. The heat stable, fire resistant composition of claim 26 wherein the weight ratio of tris(butoxyethyl) phosphate to isopropylphenyl/phenyl phosphate is about 25:75.

28. The heat stable fire resistant composition of claim 26 wherein the weight ratio of tris(butoxyethyl) phosphate to isopropylphenyl/phenyl phosphate is about 30:70.

29. The plasticizing composition of claim 1, wherein said other phosphate ester is triphenyl phosphate.

30. The plasticizing composition of claim 2, wherein said other phosphate ester is triphenyl phosphate.

31. The plasticizing composition of claim 3, wherein said other phosphate ester is triphenyl phosphate.

32. The plasticizing composition of claim 4, wherein said other phosphate ester is triphenyl phosphate.

33. The plasticizing composition of claim 5, wherein said other phosphate ester is triphenyl phosphate.

34. The heat stable, fire resistant composition of claim 15, wherein said other phosphate ester is triphenyl phosphate.

35. The heat stable, fire resistant composition of claim 16, wherein said other phosphate ester is triphenyl phosphate.

36. The heat stable, fire resistant composition of claim 17, wherein said other phosphate ester is triphenyl phosphate.

37. The heat stable, fire resistant composition of claim 18, wherein said other phosphate ester is triphenyl phosphate.

38. The heat stable, fire resistant composition of claim 19, wherein said other phosphate ester is triphenyl phosphate.

* * * * *

UNITED STATES PATENT AND TRADEMARK OFFICE
CERTIFICATE OF CORRECTION

PATENT NO. : 4,207,225

DATED : June 10, 1980

INVENTOR(S) : Harry H. Beacham and James P. Hamilton

It is certified that error appears in the above—identified patent and that said Letters Patent is hereby corrected as shown below:

Cover page, in the Abstract, second column, line 19, "consisting triaryl" should read --consisting of triaryl--. Column 2, line 4, "(2)" should read --(3). Column 7, line 61, "percent" should read --present--.

Signed and Sealed this

Sixteenth Day of December 1980

[SEAL]

Attest:

SIDNEY A. DIAMOND

Attesting Officer

Commissioner of Patents and Trademarks